United States Patent
Li et al.

(10) Patent No.: US 9,582,655 B2
(45) Date of Patent: Feb. 28, 2017

(54) ELECTRONIC DEVICE, SYSTEM FOR PAIRING ELECTRONIC DEVICES AND METHOD FOR PAIRING ELECTRONIC DEVICES

(71) Applicants: HISENSE CO., LTD., Qingdao (CN); Hisense USA Corporation, Suwanee, GA (US)

(72) Inventors: Yangyang Li, Qingdao (CN); Yuewei Lin, Qingdao (CN); Wei Zhao, Qingdao (CN); Nan Zhu, Qingdao (CN); Haibin Liu, Qingdao (CN)

(73) Assignees: HISENSE CO., LTD., Qingdao (CN); HISENSE USA CORPORATION, Suwanee, GA (US)

( * ) Notice: Subject to any disclaimer, the term of this patent is extended or adjusted under 35 U.S.C. 154(b) by 164 days.

(21) Appl. No.: 14/251,403

(22) Filed: Apr. 11, 2014

(65) Prior Publication Data
US 2015/0019880 A1    Jan. 15, 2015

(30) Foreign Application Priority Data

Dec. 12, 2013   (CN) .......................... 201310682574
Dec. 27, 2013   (CN) .......................... 201310743306

(51) Int. Cl.
*G06F 12/14*    (2006.01)
*G06F 21/42*    (2013.01)
*H04L 29/06*    (2006.01)
*H04W 12/04*    (2009.01)

(52) U.S. Cl.
CPC .......... *G06F 21/42* (2013.01); *H04L 63/0492* (2013.01); *H04W 12/04* (2013.01)

(58) Field of Classification Search
CPC . G06F 21/42; H04L 63/0492; H04L 63/0464; H04L 63/08; H04L 63/18; H04W 12/02; H04W 12/04; H04W 12/06; H04W 4/206
USPC .......................................................... 713/193
See application file for complete search history.

(56) References Cited

U.S. PATENT DOCUMENTS

| | | | | |
|---|---|---|---|---|
| 8,432,262 B2* | 4/2013 | Talty | .................. | G06K 7/10237 340/10.1 |
| 8,823,494 B1* | 9/2014 | Kovitz | ................. | H01Q 1/2225 340/10.1 |
| 2013/0148807 A1* | 6/2013 | Schwager | ............. | H04L 9/0861 380/270 |
| 2014/0269652 A1* | 9/2014 | Buesker | ................ | H04W 48/20 370/338 |

* cited by examiner

*Primary Examiner* — Kambiz Zand
*Assistant Examiner* — Noura Zoubair

(57) ABSTRACT

An electronic device includes: a data acquiring unit configured to detect an encryption apparatus in a preset distance range and to read preset data in the detected encryption apparatus; a data storage unit configured to store the preset data; and a connection establishing unit configured to establish power line communication connections, according to the preset data, with other electronic devices reading and storing the preset data. The disclosure further proposes a system for pairing electronic devices and a method for pairing electronic devices. With the technical solutions of the invention, power line communication connections between the electronic devices can be established rapidly, conveniently and more accurately.

18 Claims, 6 Drawing Sheets

---Prior Art---

US 9,582,655 B2

ELECTRONIC DEVICE, SYSTEM FOR PAIRING ELECTRONIC DEVICES AND METHOD FOR PAIRING ELECTRONIC DEVICES

CROSS-REFERENCES TO RELATED APPLICATIONS

This application claims priorities to Chinese patent application No. 201310293878.4 filed on Jul. 19, 2013, Chinese patent application No. 201310682574.7, filed on Dec. 12, 2013, and Chinese patent application No. 201310743306.1, filed on Dec. 27, 2013, the contents of which are incorporated herein by reference in their entirety.

FIELD OF THE INVENTION

The present invention relates to an electronic device, a system for pairing electronic devices and a method for pairing electronic devices.

BACKGROUND OF THE INVENTION

Data can be transmitted through a power line in the technology of Power Line Communication (PLC), to make it possible to transmit broadband data and overcome the drawback of considerable degradation in performance due to a poor capability of a wireless signal of a WLAN (Wireless Local Area Network) to pass through a wall. A user networking PLC modules has to arrange connections between the modules, but some problems may occur with establishment of the connections.

SUMMARY OF THE INVENTION

In one aspect of this application which proposes an electronic device including: a data acquiring unit configured to detect an encryption apparatus in a preset distance range and to read preset data in the detected encryption apparatus; a data storage unit configured to store the preset data; and a connection establishing unit configured to establish power line communication connections, according to the preset data, with other electronic devices reading and storing the preset data.

In another aspect of this application which further proposes a system for pairing electronic devices, the system includes at least one electronic device and an encryption apparatus, wherein the encryption apparatus stores preset data, and the electronic device includes: a data acquiring unit configured to detect the encryption apparatus in a preset distance range and to read the preset data in the detected encryption apparatus; a data storage unit configured to store the preset data; and a connection establishing unit configured to establish power line communication connections with other electronic devices reading and storing the preset data among the at least one electronic device according to the preset data.

In another aspect of this application which further proposes a method for pairing electronic devices, the method includes: detecting, by an electronic device, an encryption apparatus in a preset distance range, reading preset data in the detected encryption apparatus and storing the preset data; and establishing, by the electronic device, according to the preset data, power line communication connections with other electronic devices reading and storing the preset data.

With the foregoing technical solutions, power line communication connections between the electronic devices can be established rapidly, conveniently and more accurately.

DETAILED DESCRIPTION OF THE EMBODIMENTS

In order to make the foregoing object, features and advantages of the invention become more apparent, the invention will be further detailed below with reference to the drawings and embodiments thereof. It shall be noted that the embodiments of this application and the features in the embodiments may be combined with each other unless there is a confliction.

Numerous particular details will be set forth in the following description for full understanding of the invention, but the invention can be embodied in other embodiments than those described here, so the invention will not be limited to the embodiments described below.

Figure 1:
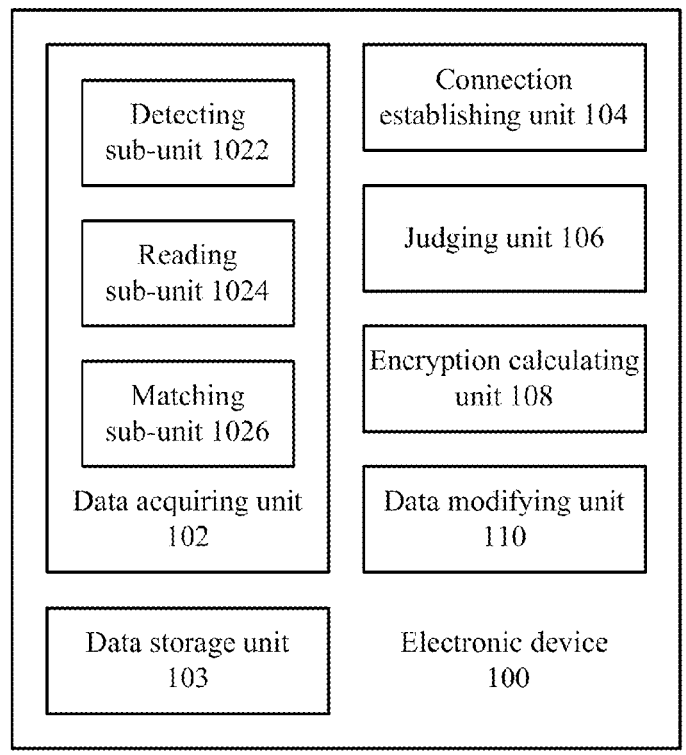
FIG. 1 illustrates a block diagram of an electronic device according to an embodiment of the invention.

FIG. 1 illustrates a block diagram of an electronic device according to an embodiment of the invention.

As illustrated in FIG. 1, the electronic device 100 according to the embodiment of the invention includes a processor configured to execute program codes to implement: a data acquiring unit 102 configured to detect an encryption apparatus in a preset distance range and to read preset data in the detected encryption apparatus; a data storage unit 103 configured to store the preset data; and a connection establishing unit 104 configured to establish power line communication connections, with other electronic devices reading and storing the preset data, based on the preset data. The data storage unit 103 may be a memory (including but not limited to a disk memory, a CD-ROM, an optical memory, etc.), in which the preset data is stored possibly together with computer usable program codes.

The electronic device 100 may be an electronic device with a PLC module (e.g., a television set, an air conditioner, a refrigerator, a socket, etc., where the socket may be a socket partially embedded in a wall or may be a power strip) and can communicate with other electronic devices through PLC and is further arranged with a Near Field Communication (NFC) module configured to detect an NFC device, and the encryption apparatus may be an NFC device, e.g., an NFC tag (i.e., NFC card) in which the preset data is stored, or, of course, the encryption apparatus may be a device with an NFC module, e.g., a handset, a tablet computer, etc., where the preset data is stored in the NFC module.

The encryption apparatus may be brought in proximity to the electronic device 100 to be encrypted, and when the encryption apparatus is located in the preset distance range of the electronic device 100, the electronic device 100 may read the preset data in the encryption apparatus through near field communication, then the encryption apparatus may be further brought in proximity to other electronic devices to be encrypted, respectively, so that the other electronic devices to be encrypted read the preset data, respectively, and in this way the electronic devices to be encrypted can establish power line communication connections according to the read preset data (which is equivalent to pairing data for encrypting the power line communication connections between the electronic devices), thus decreasing the period of time of manual operation to set pairing data one by one for each electronic device, to thereby effectively speed up setting of the pairing data for the plurality of electronic devices and establishment of the power line communication connections between the electronic devices and make it convenient for the user to use the encryption apparatus to set for the plurality of electronic devices to be encrypted the pairing data for encryption of the power line communication connections between the electronic devices; and the read preset data may be stored to avoid a failure to establish a power line communication connection due to a loss of the preset data when an electronic device is powered on again after being power off, where the preset data may be a Unique Identifier (UID) or another preset string of characters (which may be a string of digits or letters or a combination thereof, etc.). Since the preset data is stored in the encryption apparatus and electronic devices in proximity to the encryption apparatus can read the preset data, the encryption apparatus may be brought on purpose in proximity to the electronic devices to be encrypted to encrypt them, to thereby ensure that the electronic devices reading the preset data can be paired with each other, but an electronic device failing to read the preset data cannot participate in the power line communication connection, thus avoiding an improper encryption operation and an illegal power line communication connection and improving the accuracy of establishing the power line communication connections between the electronic devices.

Optionally, the data acquiring unit 102 includes a detecting sub-unit 1022, a reading sub-unit 1024 and a matching sub-unit 1026, where the detecting sub-unit 1022 is configured to detect whether there is an encryption apparatus in the preset distance range; the reading sub-unit 1024 is configured to read a verification code in the encryption apparatus when the detecting sub-unit 1022 detects the encryption apparatus, and to read the preset data when the matching sub-unit 1026 determines that the verification code matches with a preset verification code, or to stop reading data from the encryption apparatus when the matching sub-unit 1026 determines that the verification code does not match with the preset verification code; and the matching sub-unit 1026 is configured to judge whether the verification code matches with the preset verification code.

After detecting the encryption apparatus, the electronic device 100 may read the verification code therein, and determine that the encryption apparatus has a privilege to encrypt the electronic device 100 when the verification code matches with the preset verification code in the electronic device 100 and read the preset data in the encryption apparatus, or determine that the encryption apparatus has no privilege to encrypt the electronic device 100 if the read verification code does not match with the preset verification code and stop reading the data from the encryption apparatus. The privilege of the encryption apparatus can be judged, to ensure that an encryption apparatus for which the privilege is set by the user can encrypt the electronic device 100, to thereby avoid that the user cannot know pairing data for encryption of a power line communication connection because an encryption apparatus for which no privilege is set by the user encrypts the electronic device 100.

The combination of the detecting sub-unit 1022 and the reading sub-unit 1024 may be an NFC module based on radio frequency identification, e.g., an NFC card reader.

Figure 2:
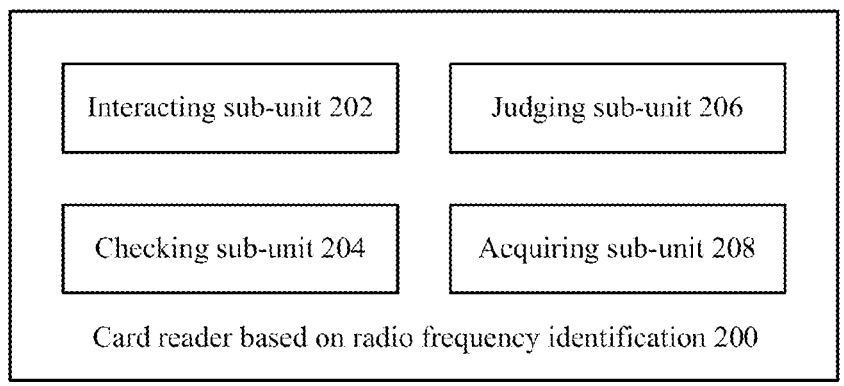
FIG. 2 illustrates a schematic block diagram of a card reader based on radio frequency identification according to an embodiment of the invention.

FIG. 2 illustrates a schematic block diagram of a card reader based on radio frequency identification according to an embodiment of the invention.

As illustrated in FIG. 2, the card reader 200 based on radio frequency identification according to the embodiment of the invention includes: an interacting sub-unit 202 configured to send a query instruction for a radio frequency card in the encryption apparatus and to receive response information to the query instruction; a checking sub-unit 204 configured to check a format of the response information received by the interacting sub-unit 202 to obtain a checking result; and a judging sub-unit 206 configured to determine that the radio frequency card is located when the checking result of the checking sub-unit 204 indicates that the format of the response information satisfies a predetermined information format.

In this technical solution, the format of the response information can be checked upon reception of the response information to the query instruction, to judge whether the format of the response information satisfies the predetermined information format, to thereby obviate the card reader from being triggered improperly due to environment interference (e.g., in a strong current environment).

In the foregoing technical solution, optionally, the checking sub-unit 204 is further configured to check whether the length in bytes of the response information satisfies a predetermined length; and the judging sub-unit 206 is further configured to determine that the radio frequency card is located when the checking result of the checking sub-unit 204 indicates that the length in bytes of the response information satisfies the predetermined length.

In this technical solution, for example, when the NFC card reader is improperly triggered, the length in bytes of received response information is not determinate, that is, may be 0 byte, 1 byte, or 2 bytes, etc., while the length of the standard response information is 2 bytes. Therefore, an improper trigger can be filtered out by judging the number of bytes of the response information.

In the foregoing technical solution, optionally, the checking sub-unit 204 is further configured to check whether a field format of the response information satisfies a predetermined field format; and the judging sub-unit 206 is further configured to determine that the radio frequency card is located when the checking result of the checking sub-unit 204 indicates that the field format of the response information satisfies the predetermined field format.

In this technical solution, it can be further judged whether the field format of the response information is the same as a standard field format upon determining that the length of the response information is 2 bytes, to further judge whether the card reader is improperly triggered, or it can be directly judged whether the field format of the response information is the same as the standard field format, to obviate an improper trigger.

In the foregoing technical solution, optionally, the interacting sub-unit 202 is further configured to send the query instruction at a predetermined time interval; and the judging sub-unit 206 is further configured to judge whether the interacting sub-unit 202 receives the response information continuously for a number of times and whether all the response information received continuously for the number of times satisfies the predetermined information format, and if so, to determine that the radio frequency card is located; and the checking sub-unit 204 is further configured to check the format of the response information received by the interacting sub-unit 202 continuously for the number of times.

In this technical solution, the query instruction is sent at the predetermined time interval, and it is judged whether the response information is received continuously for a number of times and whether all the response information received continuously for the number of times satisfies the predetermined information format, to thereby lower an influence of an environmental factor, e.g., dithering, due to which the radio frequency card cannot respond normally to the query instruction and consequently the card may be read improperly by the card reader. For example, when the radio frequency card is at a boundary of a radiation area of the card reader, dithering of the radio frequency card may cause the card reader to misjudge that the card enters a card read area again after leaving it and consequently read the card again, and an unintentional "dithering" action of the user is typically in 200 ms, so it can be set to send the query instruction at an interval of 500 ms (of course, other time intervals are also possible), and it is judged whether accurate response information is received continuously for a number of times (e.g., 3 times), to thereby lower an influence of an environmental factor, due to which the card is read improperly by the card reader.

In the foregoing technical solution, optionally, the card reader 200 further includes an acquiring sub-unit 208 (which is equivalent to the reading sub-unit 1024 described above) configured to acquire identifier information of the radio frequency card when the judging sub-unit 206 determines that the radio frequency card is located. The identifier information of the radio frequency card may be used as the preset data.

In this technical solution, for example, a UID of the radio frequency card may be acquired after the radio frequency card is located, to encrypt a communication link.

Optionally, the electronic device 100 further includes a judging unit 106, where the data acquiring unit 102 is further configured to acquire pairing data in a connection request of an electronic device to be paired when the electronic device 100 receives the connection request, and the judging unit 106 is configured to judge whether the pairing data is the same as the preset data; and the connection establishing unit 104 is further configured to establish a power line communication connection with the electronic device to be paired when the judging unit 106 determines the pairing data is the same as the preset data or to reject establishment of a power line communication connection with the electronic device to be paired when the judging unit 106 determines the pairing data is different from the preset data.

Since there may be a plurality of electronic devices to be paired going to establish power line communication connections with the electronic device 100, including electronic devices also reading and storing the preset data in the encryption apparatus and electronic devices failing to read the preset data, the electronic device 100 may judge whether the pairing data in the connection request of the electronic device to be paired is the same as the preset data upon reception of the connection request, to thereby determine the electronic devices, capable of establishing power line communication connections with the electronic device 100, among the electronic devices to be paired, to thereby avoid an illegal electronic device from establishing a power line communication connection with the electronic device 100.

Optionally, the electronic device 100 further includes an encryption calculating unit 108 configured to perform encryption calculation on the preset data through a preset algorithm to obtain encrypted data, where the connection establishing unit 104 is further configured to establish the power line communication connections with the other electronic devices according to the encrypted data.

After reading the preset data, the electronic device 100 may further perform encryption calculation on the preset data through the preset algorithm and then use the encrypted data after the encryption calculation as the pairing data of the power line communication connections, and the other electronic devices reading the preset data may also perform encryption calculation on the preset data through the preset algorithm, so that the power line communication connections can be established between the electronic deices according to the preset uniform encrypted data. Since the pairing data is encrypted by the preset encryption calculation, such a probability can be lowered that another electronic device without any privilege to establish a power line communication connection may read the encrypted data and establish an illegal power line communication connection.

Optionally, the electronic device 100 further includes a data modifying unit 110 configured to modify the preset data in response to a received data modification instruction.

The user may set new data as needed through the electronic device 100, and then send the new data to the encryption apparatus to modify the preset data therein, to thereby use the new data as pairing data for power line communication connections between the electronic devices 100.

The electronic device 100 may further include a power line communication module. Data can be transmitted through a power line in PLC, to transmit broadband data and overcome the drawback of considerable degradation in performance due to a poor capability of a WLAN for a wireless signal to pass through a wall.

To network PLC modules, according to the existing HomePlug AV protocol (HomePlug AV is a standard defined by the Home Plug Powerline Alliance to satisfy a demand for transmission of home digital multimedia, thus transmitting data over a power line, a telephone wire and a coaxial cable), a newly powered-on electronic device detecting no other electronic devices may set itself as a Central Coordinator (CCo) of a current home network and broadcast a beacon packet to inquire about presence of a PLC network or device. If there is a PLC network, then the network may send a response to the CCo and further constitute therewith a new network.

The existing HomePlug AV protocol suffers from at least such a technical problem that if there is no PLC device around the newly powered-on electronic device (that is, in the event that there is only one electronic device), then it is unnecessary to broadcast the beacon packet, which would increase power consumption of the electronic device itself and occupy a PLC link bandwidth and also increase electromagnetic radiation interference to other power consuming devices.

In view of the foregoing technical problem, an embodiment of the invention proposes an improved HomePlug AV protocol, so as to lower power consumption of the electronic device itself and its electromagnetic radiation interference to other power consuming devices.

Firstly, several terms appearing throughout this specification will be defined.

HomePlug AV: AV stands for Audio and Video, and the Home Plug Powerline Alliance was set up jointly by dozens of enterprises including Cisco, HP, Motorola, Intel, etc., in March, 2000, and a uniform standard and definitive progression for conceived deployment of a local area network of power lines. Thereafter the first standard of a power line network, referred to as HomePlug 1.0, was published by the Home Plug Powerline Alliance in June, 2001. The later HomePlug AV standard was granted by the Home Plug Powerline Alliance in August, 2005.

HomePlug AV was evolved from an access through a broadband power line, where the power line is a technology of an access to a home broadband to transmit and access a broadband data service over the Internet through medium-voltage and low-voltage power lines in an existing alternating-current power distribution network. An alternating-current power line is the most difficult wired communication medium, and predominate factors interfering with communication transmission and deteriorating a communication signal are a variety of unpredictable interference, attenuation and distortion from numerous sources, including a wide range of changes in impedance, a high attenuation level, propagation of a multi-path time delay, etc., e.g., spark noise of a switched power source, an electric light and an electric brush, electrostatic noise, noise arising from an electric motor, a microwave, a transformer, etc.; attenuation arising from a branch line, a power distribution panel, a breaker, an inductive heater, etc.; and distortion arising from an inconstant nonlinear power load, a mismatch in impedance, etc. In another example, circuit branches and loads are interconnected almost randomly, so there is an unpredictable transfer function for a pathway between any two power source sockets at home, and thus amplitude and phase responses of the pathway may vary with frequency in a wide range, where the amplitude response may go beyond an allowable range (varying from several dB to more than 80 dB); moreover, there may be a channel response varying over time when various power consuming devices are powered on and powered off. Therefore, the technology of HomePlug AV emerged. HomePlug AV is a standard defined by the Home Plug Powerline Alliance to satisfy a demand for transmission of home digital multimedia, thus transmitting data over a power line, a telephone wire and a coaxial cable. HomePlug AV is intended to build a high quality, multi-media stream and entertainment-oriented network over power lines at home, to particularly satisfy the demand for transmission of home digital multimedia. It makes use of advanced physical layer and MAC layer technologies to provide a power line network at a level of 200 Mbps for transmission of video, audio and data.

CCo stands for Central Coordinator, and is an MAC layer entity defined in the HomePlug AV protocol, controls an operation of a device in a power line network where the CCo resides and coordinates coexistence with an adjacent power line network, to support bandwidth management, access control, multi-power line network operation and other functions. Several electronic devices (stations) supporting the HomePlug AV protocol may be interconnected together into a HomePlug AV Logical Network (AVLN). There is one and only one station with the identity of a CCo in one AVLN to perform centralized management on the MAC layer throughout the AVLN. The CCo broadcasts periodically a beacon packet to all the stations in the AVLN to allocate and announce a bandwidth.

Figure 3:
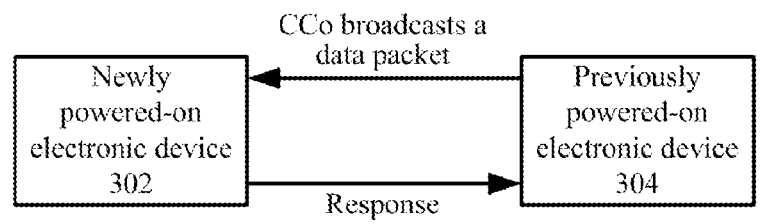
FIG. 3 illustrates a schematic diagram of networking based on the HomePlug AV protocol in the prior art.

FIG. 3 illustrates a schematic diagram of networking based on the HomePlug AV protocol in the prior art.

According to the existing HomePlug AV protocol, an electronic device with a PLC module may listen to a beacon packet over a power line medium upon being powered on. If an existing AVLN is found from listening, that is, a beacon packet sent from a CCo device in the existing AVLN (the CCo may transmit the beacon packet to notify the newly powered-on electronic device of its presence, and then they may send packets to each other to negotiate about which of them is decided to act a new CCo according to their MAC addresses) is received, then the newly powered-on electronic device may join the existing AVLN. As illustrated in FIG. 3, a newly powered-on electronic device 302 listens to a beacon packet transmitted through a power line, and a previously powered-on electronic device 304 may broadcast a beacon packet, and the newly powered-on electronic device may respond upon reception of the beacon packet.

If there is no other electronic device, that is, in the event that there is only one electronic device, then the newly powered-on electronic device itself may become a CCo and broadcast a beacon packet to build its own network. Other electronic devices may contact it and constitute therewith an AVLN after being powered on. This comes with such a problem that the newly powered-on electronic device may send a beacon packet even if there is only the newly powered-on electronic device itself which is a PLC device, and in this case such a beacon packet is useless but occupies a bandwidth of a PLC link and incurs unnecessary power consumption and also brings conductive radiation interference to other power consuming devices.

A power line communication module of an electronic device according to an embodiment of the invention will be described below with reference to FIG. 4.

Figure 4:
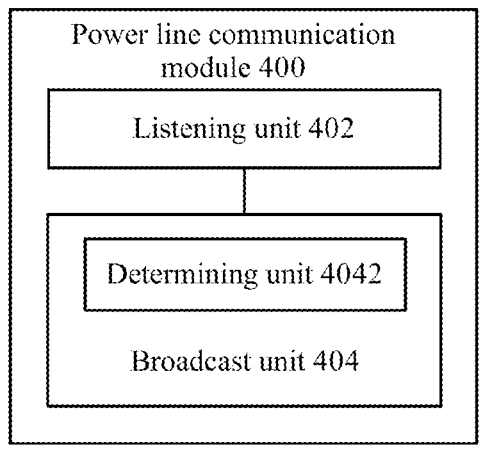
FIG. 4 illustrates a block diagram of a power line communication device according to an embodiment of the invention.

As illustrated in FIG. 4, the power line communication module 400 of the electronic device according to the embodiment of the invention includes: a listening unit 402 configured to listen to a data packet, transmitted over a power line, from other electronic devices when the electronic device accesses the power line; and a broadcast unit 404 configured to broadcast no data packet and keep silence upon detection of no data packet from any other electronic device. The electronic device according to the embodiment of the invention can support the improved HomePlug AV protocol proposed according to the embodiment of the invention. When another electronic device is powered on, the broadcast unit 404 sends no data packet and keeps silence to wait for a data packet broadcasted from the other electronic device and again will send no data packet and keep silence upon detection of no data packet from the other electronic device. Thus, when there is only one electronic device in an existing network environment, it is not necessary to determine which electronic device is a central coordinator of the existing network, and the electronic device will not send any data packet on its own initiative until a data packet sent from the other electronic devices is received, to thereby lower unnecessary electromagnetic conductive radiation and interference to the other power consuming device.

In the foregoing technical solution, optionally, the broadcast unit 404 is further configured to respond to the data packet from the other electronic devices upon detection of the data packet to join an established power line logical network.

In the foregoing technical solution, optionally, the broadcast unit 404 may include a determining unit 4042 configured to receive media access control addresses from the other electronic devices and to determine a central coordinator in the power line logical network according to the media access control address of the electronic device and the media access control addresses of the other electronic devices. The broadcast unit 404 is further configured to send a notification to the other electronic devices after determining the electronic device as the central coordinator.

Figure 5:
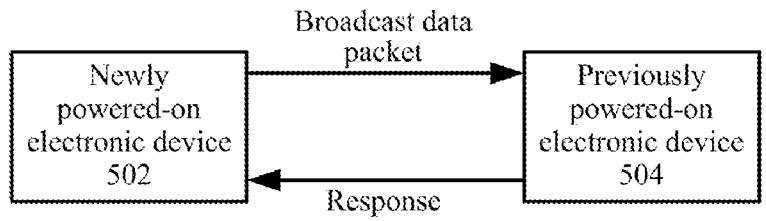
FIG. 5 illustrates a schematic diagram of networking a power line communication device based on the legacy HomePlug AV protocol and a power line communication device based on a novel HomePlug AV protocol according to an embodiment of the invention.

FIG. 5 illustrates a schematic diagram of networking an electronic device based on the legacy HomePlug AV protocol and an electronic device based on the novel HomePlug AV protocol according to an embodiment of the invention.

As illustrated in FIG. 5, a previously powered-on electronic device 504 is an electronic device based on the novel HomePlug AV protocol according to the embodiment of the invention. The electronic device 504 is silent. In this case, a newly powered-on electronic device 502 is an electronic device based on the legacy HomePlug AV protocol. The electronic device 502 may set itself as a central coordinator and broadcast a data packet when accessing a power line and no other electronic device is detected. The electronic device 504 responds to the data packet broadcasted by the electronic device 502 upon reception of the data packet and builds therewith an AVLN. They send packets to each other and determine which of the electronic devices as a new central coordinator according to their MAC addresses, for example, an electronic device with a higher MAC address may be determined as a central coordinator, or, an electronic device with a lower MAC address may be determined as a central coordinator.

In the embodiment of the invention, the previously powered-on electronic device firstly is silent and will only receive and respond to a beacon packet sent from another electronic device, before which it will not send any beacon packet on its own initiative. Thus unnecessary electromagnetic conductive radiation and interference of the electronic device to other adjacent power consuming devices can be avoided, unnecessary power consumption of the electronic device itself can be avoided, a PLC link bandwidth can be saved and backward compatibility with a legacy HomePlug AV protocol device is supported, so that the electronic devices based on the novel and legacy protocols can still find each other and further negation about a CCo and accomplish PLC networking without breaking the networking architecture of the existing protocol.

Figure 6:
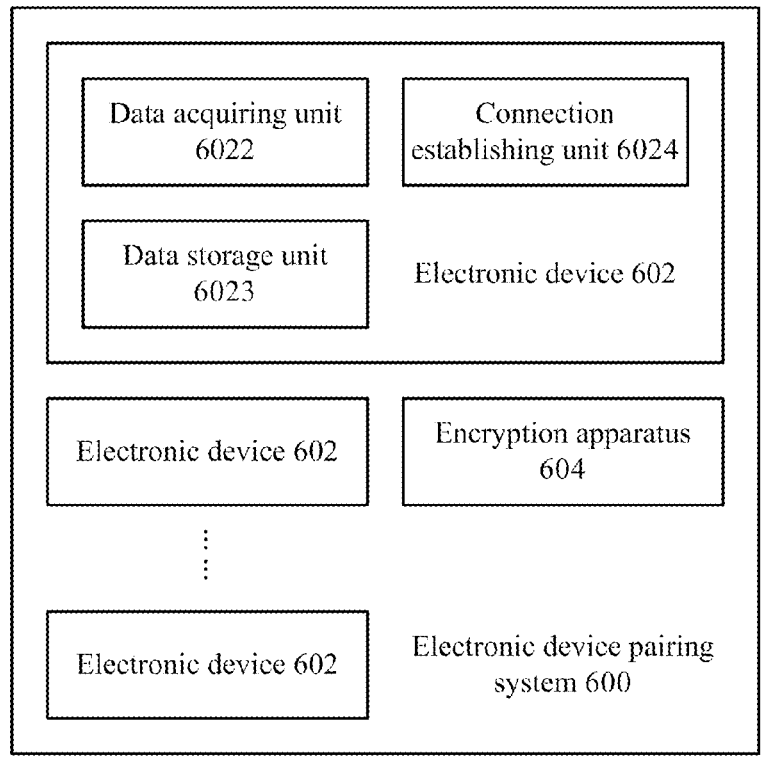
FIG. 6 illustrates a block diagram of a system for pairing electronic devices according to an embodiment of the invention.

FIG. 6 illustrates a block diagram of a system for pairing electronic devices according to an embodiment of the invention.

As illustrated in FIG. 6, the system 600 for pairing electronic devices according to the embodiment of the invention includes at least one electronic device 602 and an encryption apparatus 604, where the encryption apparatus 604 stores preset data, and the electronic device 602 includes: a data acquiring unit 6022 configured to detect the encryption apparatus 604 in a preset distance range and to read the preset data in the detected encryption apparatus 604; a data storage unit 6023 configured to store the preset data; and a connection establishing unit 6024 configured to establish power line communication connections with other electronic devices reading and storing the preset data among the at least one electronic device 602 according to the preset data.

The electronic device 602 may be a PLC electronic device (e.g., a television set, an air conditioner, a refrigerator, a socket, etc.) and may communicate with other electronic devices through PLC and is further arranged with an NFC module configured to detect an NFC device, and the encryption apparatus may be an NFC device, e.g., an NFC tag (i.e., NFC card) in which the preset data is stored, or may be a device with an NFC module, e.g., a handset, a tablet computer, etc., where the preset data is stored in the NFC module.

The encryption apparatus 604 may be brought in proximity to the electronic device 602 to be encrypted, one by one, and when the encryption apparatus 604 is located in the preset distance range of the electronic device 602, the electronic device 602 may read the preset data in the encryption apparatus 604 through near field communication, so that the respective electronic devices 602 to be encrypted can establish power line communication connections according to the read preset data (which is equivalent to pairing data for encrypting the power line communication connections between the electronic devices), thus decreasing the period of time of manual operation to set pairing data one by one for each electronic device 602, to thereby effectively speed up setting of the pairing data for the plurality of electronic devices 602 and establishment of the power line communication connections between the electronic devices 602 and make it convenient for the user to use the encryption apparatus 604 to set for the plurality of electronic devices 602 to be encrypted the pairing data for the power line communication connections; and the read preset data may be stored to avoid a failure to establish a power line communication connection due to a loss of the preset data when an electronic device is powered on again after being power off, where the preset data may be a UID or another preset string of characters (which may be a string of digits or letters or a combination thereof, etc.). Since the preset data is stored in the encryption apparatus 604 and only electronic devices in proximity to the encryption apparatus 604 can read the preset data, the encryption apparatus 604 may be brought on purpose in proximity to the electronic devices to be encrypted to encrypt them, to thereby ensure that only the electronic devices 602 reading the preset data can be paired with each other, but an electronic device failing to read the preset data cannot participate in the power line communication connection, thus avoiding an improper encryption operation and an illegal power line communication connection and improving the accuracy of establishing the power line communication connections between the electronic devices 602.

In an embodiment of the invention, computer readable program codes corresponding to the respective units described above are stored in the data storage unit and executed by the processor.

Figure 7:
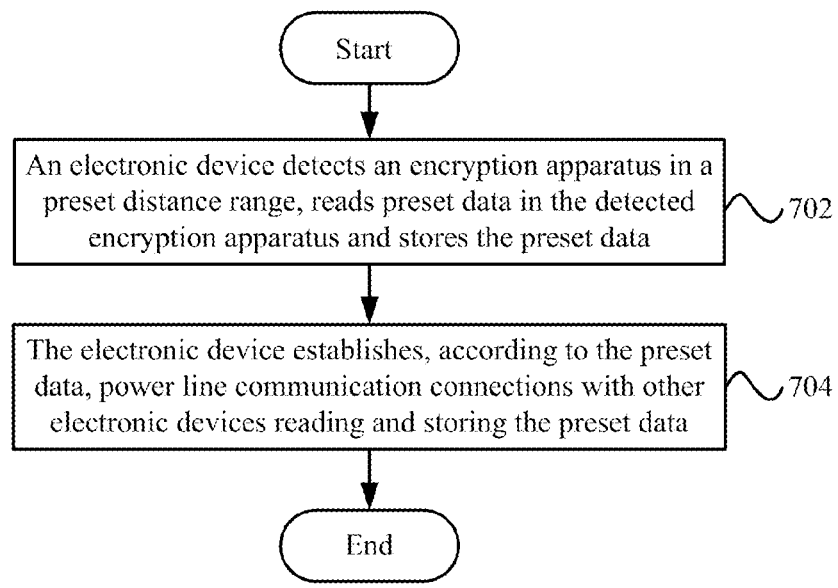
FIG. 7 illustrates a flow chart of a method for pairing electronic devices according to an embodiment of the invention.

FIG. 7 illustrates a flow chart of a method for pairing electronic devices according to an embodiment of the invention.

As illustrated in FIG. 7, the method for pairing electronic devices according to the embodiment of the invention includes: the step 702 of detecting by an electronic device an encryption apparatus in a preset distance range, reading preset data in the detected encryption apparatus and storing the preset data; and the step 704 of establishing by the electronic device, according to the preset data, power line communication connections with other electronic devices reading and storing the preset data.

The electronic device may be an electronic device with a PLC module (e.g., a television set, an air conditioner, a refrigerator, a socket, etc.) and may communicate with other electronic devices through PLC and is further arranged with an NFC module configured to detect an NFC device, and the encryption apparatus may be an NFC device, e.g., an NFC tag (i.e., NFC card) in which the preset data is stored, or may be a device with an NFC module, e.g., a handset, a tablet computer, etc., where the preset data is stored in the NFC module.

The encryption apparatus may be brought in proximity to the electronic device to be encrypted, and when the encryption apparatus is located in the preset distance range of the electronic device, the electronic device may read the preset data in the encryption apparatus through near field communication, then the encryption apparatus may be further brought in proximity to other electronic devices to be encrypted, respectively, so that the other electronic devices to be encrypted read the preset data, respectively, and in this way the electronic devices to be encrypted can establish power line communication connections according to the read preset data (which is equivalent to pairing data for encrypting the power line communication connections between the electronic devices), thus decreasing the period of time of manual operation to set pairing data one by one for each electronic device, to thereby effectively speed up setting of the pairing data for the plurality of electronic devices and establishment of the power line communication connections between the electronic devices and make it convenient for the user to use the encryption apparatus to set for the plurality of electronic devices to be encrypted the pairing data for encryption of the power line communication connections between the electronic devices; and the read preset data may be stored to avoid a failure to establish a power line communication connection due to a loss of the preset data when an electronic device is powered on again after being power off, where the preset data may be a UID or another preset string of characters (which may be a string of digits or letters or a combination thereof, etc.). Since the preset data is stored in the encryption apparatus and only electronic devices in proximity to the encryption apparatus can read the preset data, the encryption apparatus may be brought on purpose in proximity to the electronic devices to be encrypted to encrypt them, to thereby ensure that only the electronic devices reading the preset data can be paired with each other, but an electronic device failing to read the preset data cannot participate in the power line communication connection, thus avoiding an improper encryption operation and an illegal power line communication connection and improving the accuracy of establishing the power line communication connections between the electronic devices.

Figure 8:
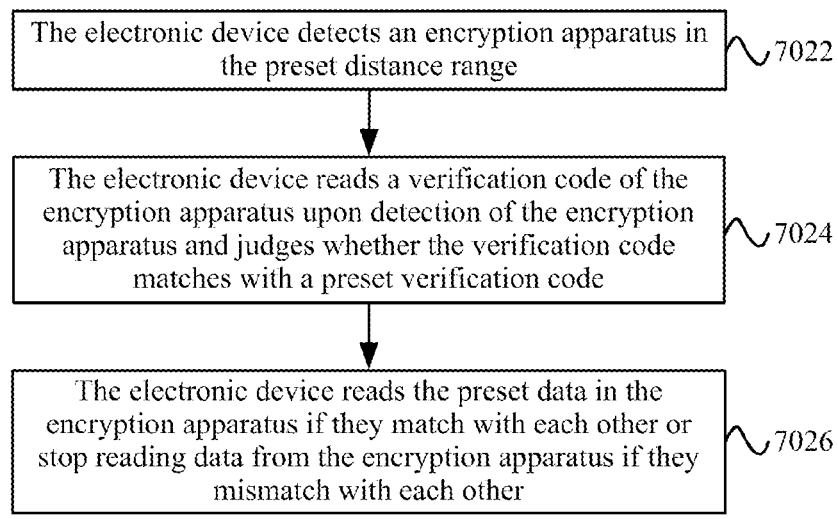
FIG. 8 illustrates a flow chart of the step 702 in FIG. 7.

Optionally, as illustrated in FIG. 8, the step 702 includes: the step 7022 of detecting by the electronic device the encryption apparatus in the preset distance range; the step 7024 of reading a verification code of the encryption apparatus upon detection of the encryption apparatus and judging whether the verification code matches with a preset verification code; and the step 7026 of reading by the electronic device the preset data in the encryption apparatus if the verification code matches with the preset verification code, or stopping reading data from the encryption apparatus if the verification code mismatches with the preset verification code.

After detecting the encryption apparatus, the electronic device may read the verification code therein, and determine that the encryption apparatus has a privilege to encrypt the electronic device when the verification code matches with the preset verification code in the electronic device and read the preset data in the encryption apparatus, or determine that the encryption apparatus has no privilege to encrypt the electronic device if the read verification code does not match with the preset verification code and stop reading the data from the encryption apparatus. The privilege of the encryption apparatus can be judged, to ensure that only an encryption apparatus for which the privilege is set by the user can encrypt the electronic device, to thereby avoid that the user cannot know pairing data for encryption of a power line communication connection because an encryption apparatus for which no privilege is set by the user encrypts the electronic device.

Figure 9:
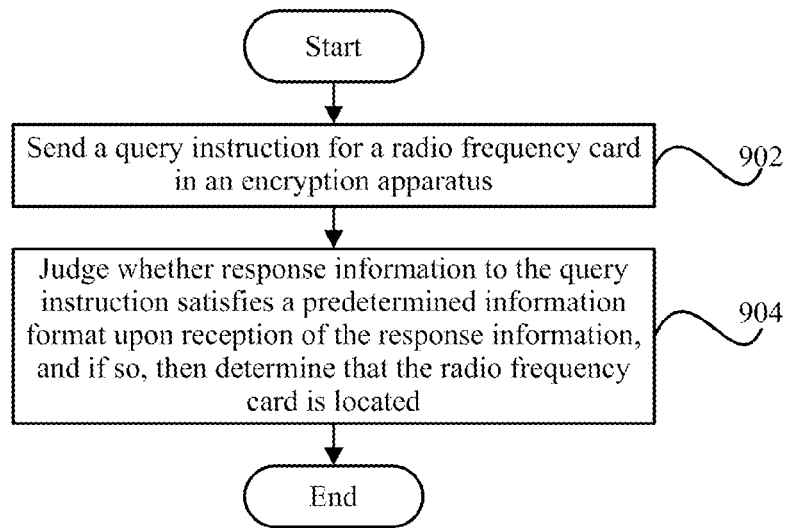
FIG. 9 illustrates a schematic flow chart of a method for reading a card based on radio frequency identification according to an embodiment of the invention.

The electronic device may include a card reader based on radio frequency identification, and FIG. 9 illustrates a schematic flow chart of a method for reading a card based on radio frequency identification according to an embodiment of the invention.

As illustrated in FIG. 9, the method for reading a card based on radio frequency identification according to the embodiment of the invention includes: the step 902 of sending a query instruction for a radio frequency card in an encryption apparatus; and the step 904 of judging whether response information to the query instruction satisfies a predetermined information format upon reception of the response information, and if so, then determining that the radio frequency card is located.

In this technical solution, the format of the response information can be checked upon reception of the response information to the query instruction, to judge whether the format of the response information satisfies the predetermined information format, to thereby obviate the card reader from being triggered improperly due to environment interference (e.g., in a strong current environment), so as to ensure that the card reader can be triggered properly.

In the foregoing technical solution, optionally, the step of judging whether the response information satisfies the predetermined information format includes: judging whether the length in bytes of the response information satisfies a predetermined length.

In this technical solution, for example, when the NFC card reader is improperly triggered, the length in bytes of received response information is not determinate, that is, may be 0 byte, 1 byte, or 2 bytes, etc., while the length of the standard response information is 2 bytes. Therefore, whether the card reader is triggered improperly can be judged by judging the number of bytes of the response information.

In the foregoing technical solution, optionally, the step of judging whether the response information satisfies the predetermined information format includes: judging whether a field format of the response information satisfies a predetermined field format.

In this technical solution, it can be further judged whether the field format of the response information is the same as a standard field format upon determining that the length of the response information is 2 bytes, to further judge whether the card reader is improperly triggered, or it can be directly judged whether the field format of the response information is the same as the standard field format, to obviate an improper trigger.

In the foregoing technical solution, optionally, the step of sending the query instruction for the radio frequency card in the encryption apparatus includes: sending the query instruction at a predetermined time interval; and before determining that the radio frequency card is located, the method further includes: judging whether the response information is received continuously for a number of times and whether all the response information received continuously for the number of times satisfies the predetermined information format, and if so, then determining that the radio frequency card is located.

In this technical solution, the query instruction is sent at the predetermined time interval, and it is judged whether the response information is received continuously for a number of times and whether all the response information received continuously for the number of times satisfies the predetermined information format, to thereby lower an influence of an environmental factor, e.g., dithering, due to which the radio frequency card cannot respond normally to the query instruction and consequently the card may be read improperly by the card reader. For example, when the radio frequency card is at a boundary of a radiation area of the card reader, dithering of the radio frequency card may cause the card reader to misjudge that the card enters a card read area again after leaving it and consequently read the card again, and an unintentional "dithering" action of the user is typically in 200 ms, so it can be set to send the query instruction at an interval of 500 ms (of course, other time intervals are also possible), and it is judged whether accurate response information is received continuously for a number of times (e.g., 3 times), to thereby lower an influence of an environmental factor, due to which the card is read improperly by the card reader.

In the foregoing technical solution, optionally, after determining that the radio frequency card is located, the method further includes: acquiring identifier information of the radio frequency card. The identifier information of the radio frequency card may be used as the preset data.

In this technical solution, for example, a UID of the radio frequency card may be acquired after the radio frequency card is located, to encrypt a communication link.

Figure 10:
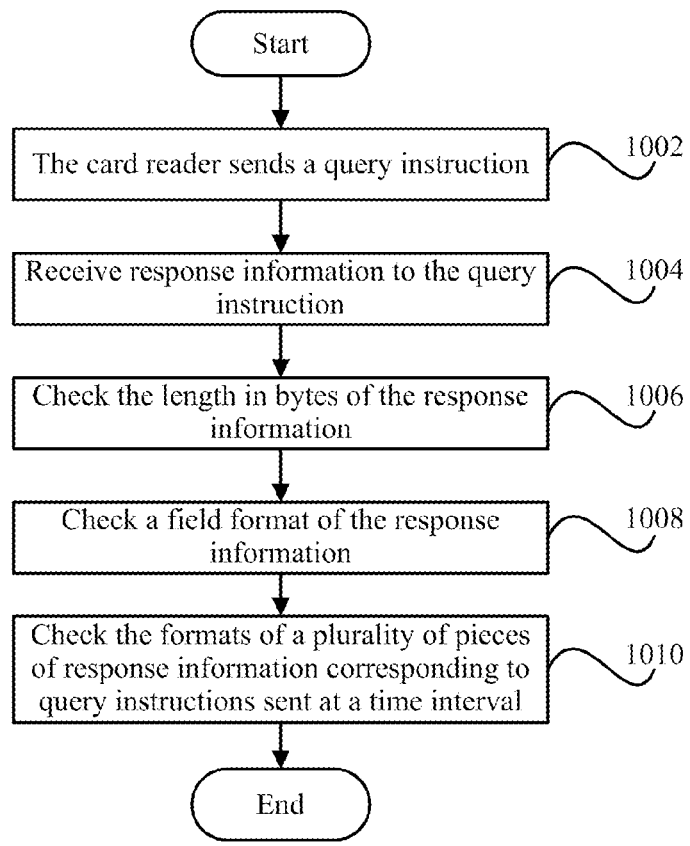
FIG. 10 illustrates a schematic flow chart of a method for reading a card based on radio frequency identification according to another embodiment of the invention.

FIG. 10 illustrates a schematic flow chart of a method for reading a card based on radio frequency identification according to another embodiment of the invention.

As illustrated in FIG. 10, the method for reading a card based on radio frequency identification according to the another embodiment of the invention includes the following steps.

In the step 1002, a card reader sends a Request Command, Type A (REQA) (REQA is a command to inquire presence of an ISO14443A card in an example of an ISO14443A card which is an NFC card), and when there is a card in a Radio Frequency (RF) radiation area of the card reader, the card may respond with an Answer To Request, Type A (ATQA) (i.e., response information to REQA).

The step 1004 is to receive the response information to the query instruction.

The step 1006 is to check the length in bytes of the response information. Since when the card reader is improperly triggered, the length in bytes of the response is not determinate, that is, may be 0 byte, 1 byte, or 2 bytes, etc., and the data may be somewhat random, but the length of the ATQA is 2 bytes, it can be determined that the card reader is improperly triggered when the number of bytes of the received response information is not 2.

The step 1008 is to check a field format of the response information. The ATQA complies with the definition of ATQA in the ISO14443A-3 protocol, where the defined format is depicted in Table 1:

TABLE 1

| MSB b16 | b15 | b14 | b13 | b12 | b11 | b10 | b9 | b8 | b7 | b6 | b5 | b4 | b3 | b2 | LSB b1 |
|---|---|---|---|---|---|---|---|---|---|---|---|---|---|---|---|
| | RFU | | | Proprietary coding | | | | UID size bit frame | | RFU | Bit frame anticollision | | | | |

Where the RFU (Reserved for Future ISO Use) field is a reserved field in the ISO protocol;

The Proprietary coding field is a proprietary coding field;

The UID size bit frame field is a unique identifier length indicator, where b8 and b7 may be coded in combination as follows: 00 represents a 4-byte UID, 01 represents a 7-byte UID, 10 represents a 10-byte UID and 11 presents reserved bits;

The Bit frame anti-collision is an anti-collision indicator field, where one of b1 to b5 shall be set to 1 and the remaining bits shall be set to 0;

The MSB (Most Significant Bit) represents the highest bit; and

The LSB (Least Significant Bit) represents the lowest bit.

Thus, it can be further judged whether the response information complies with the ISO-14443A protocol upon reception of the response information, the length of which is 2 bytes. The majority of response information in error arising from an environment factor can be precluded by checking the length in bytes and the field format of the response information.

The step 1010 is to check the formats of a plurality of pieces of response information corresponding to the query instruction sent at a time interval.

An REQA may be sent at a time interval of Δt, which can be adjusted dependent on a real condition, e.g., may be set to 500 ms.

The card reader recognizing the radio frequency card may receive the response information sent from the radio frequency card continuously for a number of times, e.g., the response information received continuously for 3 times is ATQA1, ATQA2 and ATQA3, respectively, and then it can be judged whether all of ATQA1, ATQA2 and ATQA3 are the same, whether they have been checked for their lengths in bytes and field formats and whether they are valid response information, and if so, then it is determined that the radio frequency card is located. If the response information is not received continuously for 3 times or the response information received continuously for 3 times is different or any of the response information is incorrect, then it is determined as an improper card read operation arising from an environmental factor.

Furthermore, since the card reader may read radio frequency cards in a variety of formats, e.g., ISO14443A, ISO14443B, Felica, ISO15693, etc., corresponding card locating instructions (i.e., query instructions) may be sent sequentially at a predetermined time interval, to thereby ensure the card reader responds to the different types of cards at the highest speed.

In this embodiment, since the response information is verified doubly (i.e., checked for the length in bytes and the field format), response information as a result of radiation interference of a power source can be discerned and filtered out. The formats of a plurality of pieces of response information corresponding to query instructions sent at a time interval are checked, to further filter out a negative influence as a result of radiation noise of the power source and ensure that the card reader can be free of being triggered improperly due to an environmental factor.

Furthermore, when the card is at a boundary of an RF radiation area of the card reader, an influence of an environmental factor, e.g., dithering of a human hand, may cause the card reader to misjudge that the card enters the card read area again after leaving it and consequently report the UID again or perform another subsequent card read action. It takes at least 500 ms for a normal "swiping card" action from approaching until leaving, and an unintentional "dithering" action of the human hand is typically in 200 ms, so the problem of reading the card in error due to "dithering" can be avoided by lengthening the time interval Δt at which the query instruction is sent.

In this embodiment, a number of verifications for validity are required to read the card (i.e., from absence of the card until presence of the card), and also three verifications for validity are required from presence of the card until absence of the card, to thereby avoid the problem of reading the card in error due to environmental interference. For example, when the card is in an RF radiation area of the card reader, the card reader may not necessarily receive correct response information to each query instruction due to an environmental factor. For example, if an ISO14443A type of card in an RF radiation area of the card reader fails to feed back ATQA normally due to an environmental factor, then the card reader may misjudge that the card has leaved the RF radiation area of the card reader (although the card is in the area indeed), and further misjudge that the card enters the RF radiation area and consequently read the card again upon subsequent reception of correct ATQA. This may result in serious problems, e.g., a repeated deduction from the balance of a public transportation card, a bank card, a social security card, etc.

The card reader in this embodiment has been described by taking an NFC card reader as an example, and of course, the card reader may be another type of card reader, e.g., an RFID card reader, etc., particularly may be a radio frequency card reader in a handset, a card reader in a bus, etc.

In view of the imperfect and highly limited anti-interference mechanism of the card reader based on radio frequency identification in the prior art, for example, the use of the check mechanism of the protocol can only prevent an error in a data packet, but has no help in handling the problem of improperly reading the card due to strong current interference, that is, the card reader misjudges presence of a card although the card is absent or misjudges absence of a card although the card is present. Therefore, the disclosure proposes a novel technology to read a card based on radio frequency identification, so as to avoid a card reader from being triggered improperly due to environmental interference and to ensure that the card reader can be triggered accurately and return accurate information.

Optionally, the method for pairing electronic devices further includes: acquiring, by the electronic device reading the preset data, pairing data in a connection request of an electronic device to be paired upon reception of the connection request, judging whether the pairing data is the same as the preset data, and if so, then establishing a power line communication connection with the electronic device to be paired; otherwise, rejecting establishment of a power line communication connection with the electronic device to be paired.

Since there may be a plurality of electronic devices to be paired going to establish power line communication connections with the electronic device, including electronic devices also reading and storing the preset data in the encryption apparatus and electronic devices failing to read the preset data, the electronic device may judge whether the pairing data in the connection request of the electronic device to be paired is the same as the preset data upon reception of the connection request, to thereby determine the electronic devices, capable of establishing power line communication connections with the electronic device, among the electronic devices to be paired, to thereby avoid an illegal electronic device from establishing a power line communication connection with the electronic device.

Optionally, the method for pairing electronic devices further includes: the electronic device performs encryption calculation on the read preset data through a preset algorithm to obtain encrypted data and establishes the power line communication connections with the other electronic devices according to the encrypted data.

After reading the preset data, the electronic device may further perform encryption calculation on the preset data through the preset algorithm and then use the encrypted data after the encryption calculation as the pairing data of the power line communication connections, and the other electronic devices reading the preset data may also perform encryption calculation on the preset data through the preset algorithm, so that the power line communication connections can be established between the electronic deices according to the preset uniform encrypted data. Since the pairing data is encrypted by the preset encryption calculation, such a probability can be lowered that another electronic device without any privilege to establish a power line communication connection may read the encrypted data and establish an illegal power line communication connection.

Optionally, the method for pairing electronic devices further includes: listening to a data packet, transmitted over a power line, from another electronic device when the electronic device accesses the power line; and broadcasting no data packet and keep silence upon detection of no data packet from any other electronic device, where the electronic device includes a power line communication module.

Figure 11:
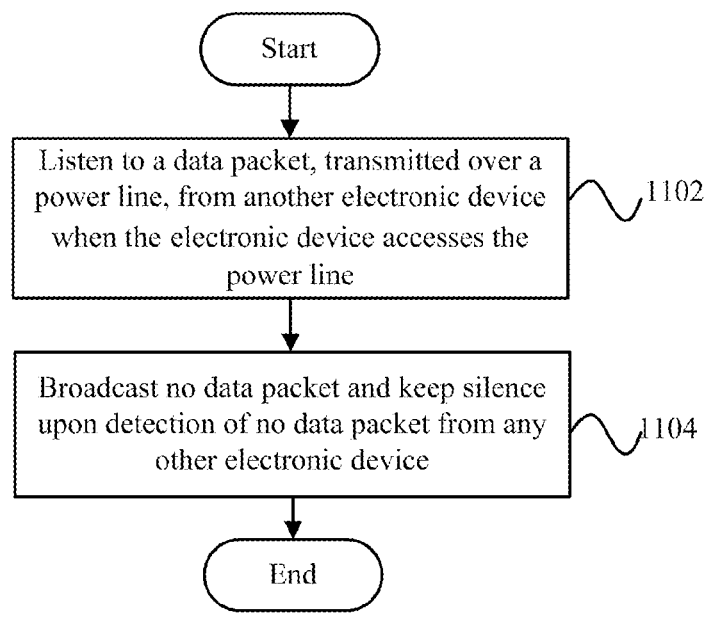
FIG. 11 illustrates a flow chart of an access method for a power line communication device according to an embodiment of the invention.

As illustrated in FIG. 11, the flow of the HomePlug AV protocol described above is improved according to an embodiment of the invention, the embodiment of the invention proposes a novel access method for an electronic device, which improves the original protocol and is backward compatible with the original protocol (a device of the novel protocol can interact with a device of the legacy protocol and accomplish therewith PLC networking without breaking the existing networking mechanism. The access method for an electronic device includes the following steps.

The step 1102 of listening to a data packet, transmitted over a power line, from another electronic device when the electronic device accesses the power line; and the step 1104 of broadcasting no data packet and keeping silence upon detection of no data packet from the other electronic devices. When there is an electronic device powered on, the electronic device sends no data packet and keeps silence to wait for a data packet broadcasted from another electronic device, and again sends no data packet and keeps silence upon detection of no data packet from any other electronic device. Thus, when there is only one electronic device in an existing network environment, it is not necessary to determine which electronic device is a central coordinator of the existing network, and the electronic device will not send any data packet on its own initiative until a data packet sent from another electronic device is received, to thereby lower unnecessary electromagnetic conductive radiation and interference to the other power consuming device.

In the foregoing technical solution, optionally, the method may further include the steps of: if the data packet from another electronic device is detected, then responding to the data packet and joining an established power line logical network. The other electronic device is an electronic device based on the legacy protocol. Thus, the novel protocol according to the embodiment of the invention can be compatible with the legacy protocol without breaking the networking architecture of the existing protocol.

In any of the foregoing technical solutions, optionally, a central coordinator in the power line logical network is determined according to the media access control address of the electronic device and the media access control addresses of the other electronic devices; and a notification is sent to the other electronic devices after the electronic device is determined as the central coordinator. At least one electronic device accessing the power line among the other electronic devices broadcasts the data packet if no data packet from any other electronic device is detected.

The access method for an electronic device according to the disclosure is applicable to a scenario where there is only one electronic device, and when there are a plurality of electronic devices, at least one of the electronic devices is required to be based on the original protocol, and the electronic devices cannot notify each other if all of them are based on the novel protocol.

In other words, this method is applicable to a home appliance with a PLC module (e.g., an air conditioner, a refrigerator, a television set, a socket, etc.). PLC devices need to be used in pair, and the improved HomePlug AV protocol according to the embodiment of the invention may be adopted in the home appliances while the existing HomePlug AV protocol is still adopted in a PLC power modem, so that formation of an AVLN network can be ensured at an improved gain, to further ensure connectivity of PLC links (the power model using the existing protocol may set itself as a CCo and send a beacon packet to the PLC home appliances on its own initiative, to form the network and perform PLC), on the other hand, the improved HomePlug AV protocol according to the embodiment of the invention can be compatible with the legacy HomePlug AV protocol without breaking the existing networking mechanism.

According to the improved HomePlug AV protocol according to the embodiment of the invention, an electronic device accessing a power line keeps silence (sends no beacon packet), and further keeps silence if no other electronic device is found (no beacon packet broadcasted from any other electronic device is received) after being powered on; or if an AVLN has been formed by other electronic devices (that is, a beacon packet sent from a CCo of the AVLN is received) after being powered on, then upon reception of such a beacon packet, the electronic device responds to the beacon packet and negotiates about which of the electronic devices acts as a CCo of the new network and thereafter forms the new network. The disclosure is particularly applicable to a scenario where only one electronic device is powered on, and since the electronic device sends no data packet upon being powered on, electromagnetic conductive radiation and interference thereof to other power consuming devices can be avoided, and also unnecessary power consumption of the electronic device can be avoided to save a PLC link bandwidth and for backward compatibility with a legacy HomePlug AV protocol device, then the devices supporting the novel and legacy protocols can still find each other and further negation about a CCo and accomplish PLC networking without breaking the networking architecture of the existing protocol.

The PLC module as described in the above embodiments may be embedded in a home appliance or may be arranged outside the home appliance.

Figure 12A:
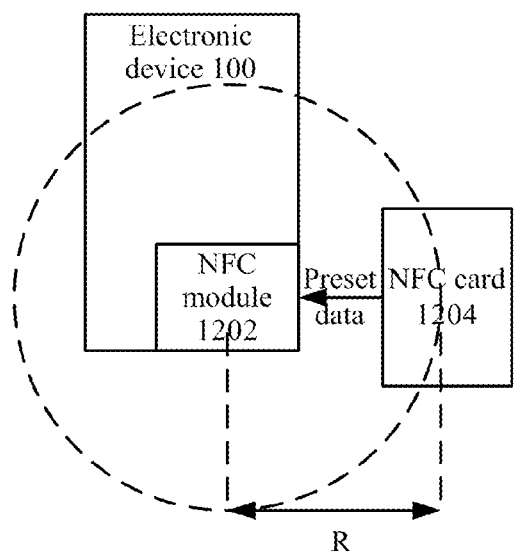
FIG. 12A and FIG. 12B illustrate schematic diagrams of establishing a power line communication connection according to an embodiment of the invention.
Figure 12B:
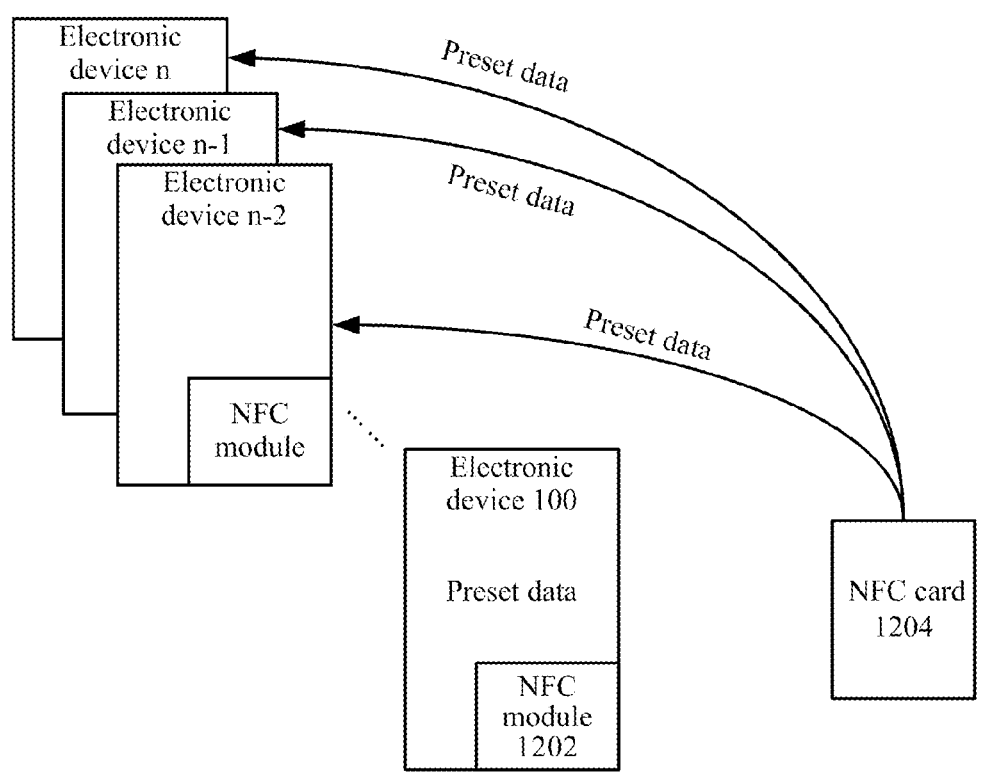

FIG. 12A and FIG. 12B illustrate schematic diagrams of establishing a power line communication connection according to an embodiment of the invention.

As illustrated in FIG. 12A, the electronic device 100 as illustrated in FIG. 1 may be a device including a PLC module and capable of communicating with another electronic device through the PLC module, and the electronic device 100 may further be arranged with an NFC module 1202, and the encryption apparatus may be an NFC device arranged, for example, like a card, simply referred to as an NFC card 1204. The NFC module 1202 may detect another NFC device in a specific space range, e.g., a detection distance R=10 centimeters, then when a distance between the center of the NFC card 1204 and the center of the NFC module 1202 is less than or equal to 10 centimeters, the NFC module 1202 can detect the NFC card 1204 and further read the preset data from the NFC card 1204 as the pairing data for establishing power line communication connections with other PLC devices.

As illustrated in FIG. 12B, after the NFC card 1204 is brought in proximity to the electronic device 100, the electronic device 100 reads the preset data in the NFC card 1204 as the pairing data for encrypting power line communication connections with other electronic devices, and then the NFC card 1204 is brought in proximity to the other electronic devices one by one, for example, there are n electronic devices in total, and then it is brought in proximity respectively to each of the n electronic devices, so that the n electronic devices read the preset data in the NFC card 1204 as the pairing data, respectively, then power line communication connections can be established between the n electronic devices with the preset data being pairing data, thus decreasing the period of time of manual operation for each electronic device to negotiate about the pairing data, and the pairing data can be set for each electronic device simply by swiping the card in proximity to each PLC device, which is simple and convenient, and the preset data may be a UID or another string of characters preset in the NFC card (which may be a string of digits or letters or a combination thereof, etc.). A power line communication connection can only be established between electronic devices reading the preset data, and an electronic device failing to read the preset data cannot establish a power line communication connection with an electronic device reading the preset data, since their pairing data are different, to thereby lower a probability of improper encryption and an illegal power line communication connection.

With the technical solutions according to the embodiments of this application, passwords can be set through near field communication for electronic devices between which power line communication connections are established, to thereby establish the power line communication connections rapidly, conveniently and accurately between the plurality of electronic devices.

The foregoing description is merely illustrative of the embodiments of the invention, but not intended to limit the invention, and numerous modifications and variations to the invention will occur to those skilled in the art. Any modifications, equivalent substitutions, adaptations, etc., made without departing from the spirit and the principle of the invention shall come into the claimed scope of the invention.

The invention claimed is:

1. An electronic device, comprising: a processor; and
a memory storing at least one instruction configured to be executed by the processor to implement;
a data acquiring unit configured to detect a configuration apparatus in a preset distance range and to read preset data in the detected configuration apparatus;
a data storage unit configured to store the preset data;
a connection establishing unit configured to establish power line communication connections, according to the preset data, with other electronic devices reading and storing the preset data; and
a power line communication module,
wherein the power line communication module comprises:
a listening unit configured to listen to a data packet, transmitted over a power line, from the other electronic devices when the electronic device accesses the power line; and
a broadcast unit configured to broadcast no data packet and keep silence upon detection of no data packet from the other electronic devices
wherein the electronic device further comprises a judging unit, wherein:
the data acquiring unit is further configured to acquire pairing data in a connection request of an electronic device to be paired when the electronic device receives the connection request;
the judging unit is configured to judge whether the pairing data is the same as the preset data; and
the connection establishing unit is configured to establish a power line communication connection with the electronic device to be paired when the judging unit determines that the pairing data is the same as the preset data or to reject establishment of the power line communication connection with the electronic device to be paired when the judging unit determines that the pairing data is different from the preset data,
wherein the broadcast unit is further configured to send a notification to the other electronic devices after the electronic device is determined as a central coordinator, and
wherein at least one electronic device accessing the power line among the other electronic devices broadcasts a data packet if no data packet from any other electronic device is detected.

2. The electronic device according to claim 1, wherein the data acquiring unit comprises a detecting sub-unit, a reading sub-unit and a matching sub-unit, and wherein:
the detecting sub-unit is configured to detect the configuration apparatus in the preset distance range;
the reading sub-unit is configured to read a verification code in the configuration apparatus when the detecting sub-unit detects the configuration apparatus, and to read the preset data when the matching sub-unit determines that the verification code matches with a preset verification code or to stop reading data from the configuration apparatus when the matching sub-unit determines that the verification code mismatches with the preset verification code; and
the matching sub-unit is configured to judge whether the verification code matches with the preset verification code.

3. The electronic device according to claim 2, wherein the detecting sub-unit comprises:
an interacting sub-unit configured to send a query instruction for a radio frequency card in the configuration apparatus and to receive response information to the query instruction;
a checking sub-unit configured to check a format of the response information received by the interacting sub-unit to obtain a checking result; and
a judging sub-unit configured to determine that the radio frequency card is located when the checking result of the checking sub-unit indicates that the format of the response information satisfies a predetermined information format.

4. The electronic device according to claim 3, wherein:
the checking sub-unit is further configured to check whether the length in bytes of the response information satisfies a predetermined length or to check a field format of the response information satisfies a predetermined field format; and
the judging sub-unit is further configured to determine that the radio frequency card is located when the checking result indicates that the length in bytes of the response information satisfies the predetermined length or to determine that the radio frequency card is located when the checking result indicates that the field format of the response information satisfies the predetermined field format.

5. The electronic device according to claim 3, wherein:
the interacting sub-unit is further configured to send the query instruction at a predetermined time interval;
the judging sub-unit is further configured to judge whether the interacting sub-unit receives the response information continuously for a number of times and whether all the response information received continuously for the number of times satisfies the predetermined information format, and if so, to determine that the radio frequency card is located; and
the checking sub-unit is further configured to check the format of the response information received by the interacting sub-unit continuously for the number of times.

6. The electronic device according to claim 1, further comprising: an encryption code configured to perform encryption calculation on the preset data through a preset algorithm to obtain encrypted data, wherein the connection establishing unit is further configured to establish the power line communication connections with the other electronic devices according to the encrypted data.

7. The electronic device according to claim 1, further comprising:
a data modifying unit configured to modify the preset data in response to a received data modification instruction.

8. The electronic device according to claim 1, wherein the broadcast unit is further configured, upon detection of the data packet from the other electronic devices, to respond to the data packet and to join an established power line logical network.

9. The electronic device according to claim 8, wherein the broadcast unit comprises: a determining unit configured to receive media access control addresses from the other electronic devices and to determine the central coordinator in the power line logical network according to the media access control address of the electronic device and the media access control addresses of the other electronic devices.

10. A system for pairing electronic devices, comprising at least one electronic device and a configuration apparatus, wherein the configuration apparatus stores preset data, and the electronic device comprises:
   a data acquiring unit configured to detect the configuration apparatus in a preset distance range and to read the preset data in the detected configuration apparatus;
   a data storage unit configured to store the preset data;
   a connection establishing unit configured to establish power line communication connections with other electronic devices reading and storing the preset data among the at least one electronic device according to the preset data; and
   a power line communication module,
   wherein the power line communication module comprises:
      a listening unit configured to listen to a data packet, transmitted over a power line, from the other electronic devices when the electronic device accesses the power line; and
      a broadcast unit configured to broadcast no data packet and keep silence upon detection of no data packet from the other electronic devices,
   wherein the electronic device further comprises a judging unit, wherein:
      the data acquiring unit is further configured to acquire pairing data in a connection request of an electronic device to be paired when the electronic device receives the connection request;
      the judging unit is configured to judge whether the pairing data is the same as the preset data; and
      the connection establishing unit is configured to establish a power line communication connection with the electronic device to be paired when the judging unit determines that the pairing data is the same as the preset data or to reject establishment of the power line communication connection with the electronic device to be paired when the judging unit determines that the pairing data is different from the preset data,
   wherein the broadcast unit is further configured to send a notification to the other electronic devices after the electronic device is determined as a central coordinator, and
   wherein at least one electronic device accessing the power line among the other electronic devices broadcasts a data packet if no data packet from any other electronic device is detected.

11. A method for pairing electronic devices, comprising:
   detecting, by an electronic device, a configuration apparatus in a preset distance range, reading preset data in the detected configuration apparatus and storing the preset data;
   establishing, by the electronic device, according to the preset data, power line communication connections with other electronic devices reading and storing the preset data;
   listening to a data packet, by the electronic device, transmitted over a power line, from the other electronic devices when the electronic device accesses the power line; and
   broadcasting, by the electronic device, no data packet and keeping silence upon detection of no data packet from the other electronic devices,
   wherein the method further comprises:
      acquiring, by the electronic device, pairing data in a connection request of an electronic device to be paired upon reception of the connection request;
      judging, by the electronic device, whether the pairing data is the same as the preset data; and
      establishing, by the electronic device, a power line communication connection with the electronic device to be paired if the pairing data is the same as the preset data,
   wherein the method further comprises sending, by the electronic device, a notification to the other electronic devices after the electronic device is determined as a central coordinator, and
   wherein at least one electronic device accessing the power line among the other electronic devices broadcasts a data packet if no data packet from any other electronic device is detected.

12. The method for pairing electronic devices according to claim 11, wherein detecting, by an electronic device, a configuration apparatus in a preset distance range, reading preset data in the detected configuration apparatus and storing the preset data comprises:
   detecting, by the electronic device, the configuration apparatus in the preset distance range;
   reading a verification code of the configuration apparatus upon detection of the configuration apparatus and judging whether the verification code matches with a preset verification code; and
   reading the preset data from the configuration apparatus if the verification code matches with the preset verification code.

13. The method for pairing electronic devices according to claim 12, wherein detecting, by the electronic device, the configuration apparatus in the preset distance range comprises:
   sending a query instruction for a radio frequency card in the configuration apparatus; and
   judging whether response information to the query instruction satisfies a predetermined information format upon reception of the response information, and if so, then determining that the radio frequency card is located.

14. The method for pairing electronic devices according to claim 13, wherein the step of judging whether the response information satisfies the predetermined information format comprises:
   judging whether the length in bytes of the response information satisfies a predetermined length; or
   judging whether a field format of the response information satisfies a predetermined field format.

15. The method for pairing electronic devices according to claim 13, wherein sending the query instruction for the radio frequency card in the configuration apparatus comprises:
   sending the query instruction at a predetermined time interval;
   wherein before determining that the radio frequency card is located, the method further comprises:
      judging whether the response information is received continuously for a number of times and whether all the response information received continuously for the number of times satisfies the predetermined information format, and if so, then determining that the radio frequency card is located.

16. The method for pairing electronic devices according to claim 11, further comprising: performing, by the electronic device, encryption calculation on the read preset data through a preset algorithm to obtain encrypted data, and establishing the power line communication connections with the other electronic devices according to the encrypted data.

17. The method for pairing electronic devices according to claim 11, further comprising:
   if the data packet from the other electronic devices is detected, then responding to the data packet and joining an established power line logical network.

18. The method for pairing electronic devices according to claim 17, wherein the central coordinator in the power line logical network is determined according to the media access control address of the electronic device and the media access control addresses of the other electronic devices.

* * * * *